United States Patent
Gondi

(10) Patent No.: US 8,656,389 B2
(45) Date of Patent: Feb. 18, 2014

(54) VIRTUAL PORT COMMAND PROCESSING DURING MIGRATION OF VIRTUAL MACHINE

(75) Inventor: Anjaneya Prasad Gondi, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 199 days.

(21) Appl. No.: 13/214,478

(22) Filed: Aug. 22, 2011

(65) Prior Publication Data

US 2013/0055240 A1 Feb. 28, 2013

(51) Int. Cl.
- G06F 9/455 (2006.01)
- G06F 9/46 (2006.01)
- G06F 15/173 (2006.01)
- G06F 15/16 (2006.01)

(52) U.S. Cl.
USPC ............... 718/1; 718/100; 718/102; 718/104; 718/105; 709/223; 709/224; 709/226; 709/227; 709/228; 709/229

(58) Field of Classification Search
None
See application file for complete search history.

(56) References Cited

U.S. PATENT DOCUMENTS

| | | | |
|---|---|---|---|
| 8,166,176 B2 * | 4/2012 | Kumar et al. | 709/227 |
| 2002/0071386 A1 * | 6/2002 | Gronke | 370/217 |
| 2009/0025007 A1 * | 1/2009 | Hara et al. | 718/105 |
| 2009/0292858 A1 * | 11/2009 | Lambeth et al. | 711/6 |
| 2010/0070722 A1 * | 3/2010 | Otani et al. | 711/162 |
| 2010/0293552 A1 * | 11/2010 | Allen et al. | 718/105 |
| 2011/0153715 A1 * | 6/2011 | Oshins et al. | 709/203 |

* cited by examiner

Primary Examiner — Emerson Puente
Assistant Examiner — Charles Swift

(57) ABSTRACT

In one embodiment, a method includes upon receipt from a first host of a command to pause a virtual port (Vport) associated with a first physical port establishing a connection with the first host, changing a current state of the Vport from an active state to a paused state. The changing of the current state of the Vport to the paused state does not tear down a current session between the Vport and a set of storage disks. The method further includes upon receipt from a second host of a command to resume the Vport at a second physical port establishing a connection with the second host, changing the current state of the Vport from the paused state to the active state and associating the Vport with the second physical port.

21 Claims, 8 Drawing Sheets

VIRTUAL PORT COMMAND PROCESSING DURING MIGRATION OF VIRTUAL MACHINE

BACKGROUND

Enterprise data centers that utilize virtualization technologies often include multiple servers (also referred to herein as "hosts") that share access to storage devices (e.g., disk arrays, etc.) through a storage area network (SAN). Each host is able to support simultaneous execution of multiple virtual machines (VMs). By storing VM images (also referred to as virtual disk files) in a SAN that is commonly accessible by multiple servers, a data center is able to launch any particular virtual machine on any of the servers thereby providing the data center an increased capability to manage its computing resources efficiently. For example, using technologies such as VMware's VMotion™ technology, a data center can perform a "live migration" of a VM that is running on one host to another host in the event that the first server is failing or underperforming. The new host is able to support the migration of the VM because, in part, it is able to access the VM's image that is stored on shared storage accessible by both the new host and the original host.

When a VM is launched on a host, the VM negotiates a connection session with the SAN in order to gain access to the VM's image which resides in a particular logical unit number (LUN) or data volume of the SAN. For example, if the host is physically connected to a Fiber Channel (FC) switch of the SAN, the VM (or host, on behalf of the VM) may request that the FC switch allocate to the VM a unique identifier referred to as a "virtual port" (Vport) that is associated with the actual physical port of the FC switch that connects to the host and that has been granted access to the LUN containing the VM's virtual disk file. In this manner, any request for data transmitted by the VM (or the host on behalf of the VM) that includes the allocated Vport and is received at the particular physical port of the FC switch can be identified by the FC switch as a request from the specific VM. As should be recognized, the use of such Vports provides FC switches the ability to simultaneously support different VMs (i.e., residing on the same host) at a single physical port by distinguishing among data requests from the different VMs that reside on the same host (i.e., connected to the FC switch via the same physical port) and thus handle such data requests appropriately, for example, by routing them to the correct LUNs, etc.

Because FC switches bind Vports to particular physical ports on the FC switch, Vports cannot be maintained during live migration of a VM from one host to another host. In particular, because the new host supporting the VM after live migration is necessarily connected to the FC switch (or a different FC switch) on a different port, the FC switch will generate errors or faults if it receives data requests from the VM that include the same Vport as used by the VM when it was running on the original host (and which was bound to a different physical port). Instead, during a live migration, the VM requests deletion of its original Vport on the original host, thereby tearing down its current connection session with the FC switch, and upon the VM's instantiation on the new host, negotiates a new connection session with the FC switch with a new Vport. In certain environments or implementations, multiple Vports may need to be created and deleted at the FC switch in order complete a live migration, thereby consuming a significant amount of time in the live migration process. For example, prior to migrating a VM to a new host, during a "pre-flight check" stage, the new host may need to first negotiate a Vport connection session with the FC switch to which it is connected to initially confirm that the new host is able to connect to the particular LUN in the SAN that stores the VM's virtual disk file. If the new host is indeed able to connect to the particular LUN storing the VM's virtual disk file, then it is an appropriate candidate to host the VM and will tear down the Vport connection session. When the new host receives the VM through live migration, it will again create a new Vport connection session in the FC switch to support the running VM.

SUMMARY

In one embodiment, a method includes upon receipt from a first host of a command to pause a virtual port (Vport) associated with a first physical port establishing a connection with the first host, changing a current state of the Vport from an active state to a paused state. The changing of the current state of the Vport to the paused state does not tear down a current session between the Vport and a set of storage disks. The method further includes upon receipt from a second host of a command to resume the Vport at a second physical port establishing a connection with the second host, changing the current state of the Vport from the paused state to the active state and associating the Vport with the second physical port.

In one embodiment, a non-transitory computer-readable storage medium containing instructions for controlling a computer system is provided. The instructions control the computer system to be operable to: change a current state of the Vport from an active state to a paused state upon receipt from a first host of a command to pause a virtual port (Vport) associated with a first physical port establishing a connection with the first host, wherein the changing of the current state of the Vport to the paused state does not tear down a current session between the Vport and a set of storage disks; and change the current state of the Vport from the paused state to the active state and associating the Vport with the second physical port upon receipt from a second host of a command to resume the Vport at a second physical port establishing a connection with the second host.

In one embodiment, an apparatus includes one or more computer processors and a computer-readable storage medium. The computer readable medium includes instructions for controlling the one or more computer processors to be operable to: change a current state of the Vport from an active state to a paused state upon receipt from a first host of a command to pause a virtual port (Vport) associated with a first physical port establishing a connection with the first host, wherein the changing of the current state of the Vport to the paused state does not tear down a current session between the Vport and a set of storage disks; and change the current state of the Vport from the paused state to the active state and associating the Vport with the second physical port upon receipt from a second host of a command to resume the Vport at a second physical port establishing a connection with the second host.

The following detailed description and accompanying drawings provide a more detailed understanding of the nature and advantages of the present invention.

DETAILED DESCRIPTION

In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein. For example, although a Fibre Channel switch and network are described, other storage configurations may be used.

Figure 1:
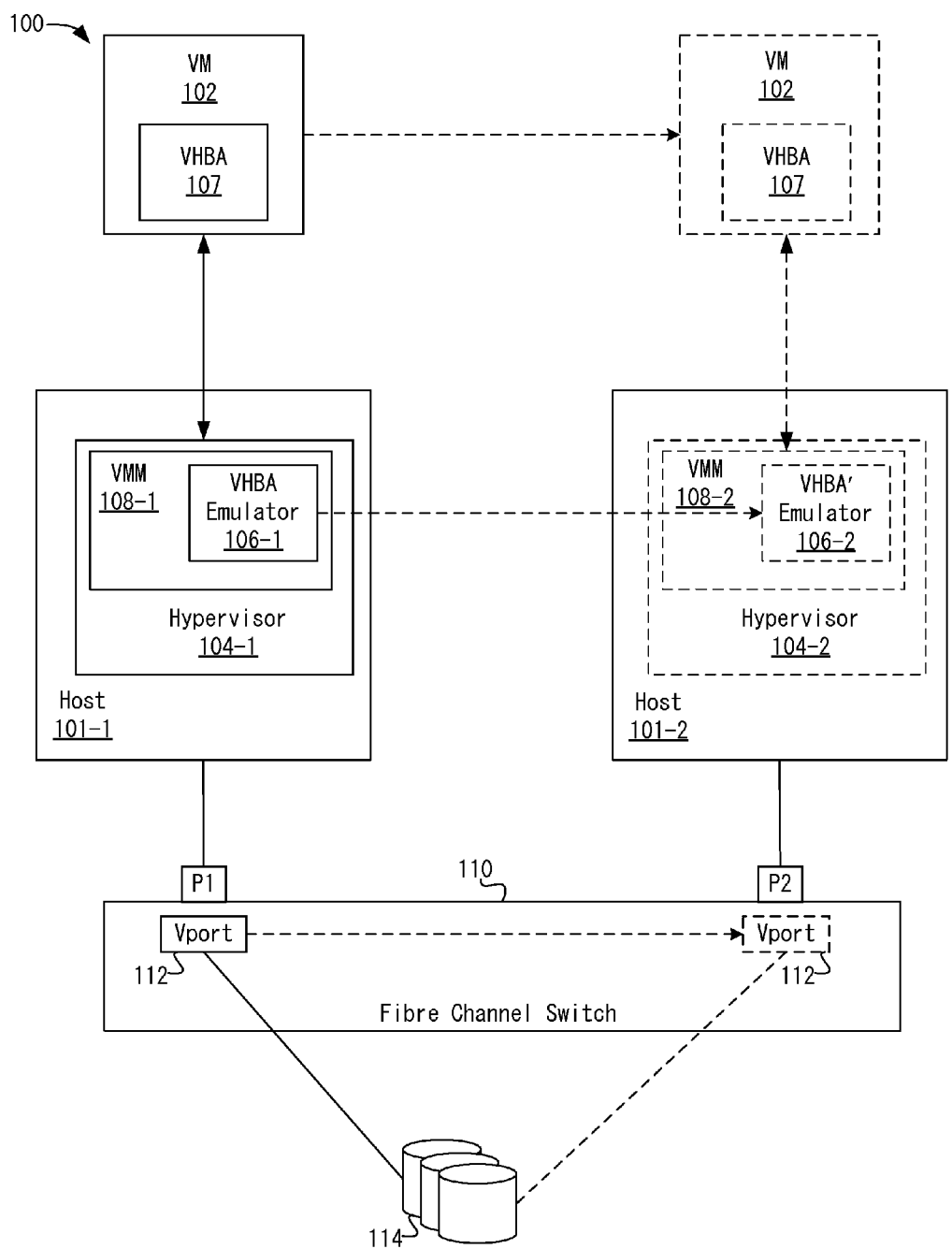
FIG. 1 shows an example of a system for processing of a Vport while migrating a virtual machine from a first host to a second host according to one embodiment.

FIG. 1 shows an example of a system 100 for processing of a Vport while migrating a virtual machine (VM) from a first host 101-1 to a second host 101-2 according to one embodiment. Hosts 101 are connected through a storage network to storage disks 114 of a storage array. There may be any number n of hosts 101, each of which may comprise a general purpose computer system having one or more applications, virtual machines, or other entities, accessing data stored on storage disks 114. The storage network may be a wide area network, a local area network, or a network hosting a protocol especially suited for storage arrays, such as Fibre Channel, iSCSI, HyperSCSI, etc. In the embodiment of FIG. 1, the storage network includes a Fibre Channel (FC) switch 110. Additional switches 110 may also be included. Although a FC switch is disclosed, other storage switches compatible with other storage protocols and networks may be used. The storage array may be any type of storage array such as a network-attached storage (NAS) or a blocked-based device over a storage area network (SAN). The storage array includes an array of devices referred to as storage disks 114. The use of the term, "disk" herein, should therefore not be construed as limited only to rotating disk storage media, but includes solid state disks (SSD) and other storage technologies.

As previously discussed, for a variety of reasons, a data center (or IT administrator of the data center) may desire to migrate a VM running on host 101-1 to host 101-2, which are depicted as separate physical computing machines. Each of hosts 101 includes a hypervisor 104 (also referred to as "virtualization software") that supports an execution space within which VMs, such as VM 102, can be instantiated and executed. In one embodiment, hypervisor 104 may correspond to the ESXi™ hypervisor in the vSphere™ product developed and distributed by VMware, Inc., Palo Alto, Calif., although it should be recognized that vSphere is not required in the practice of the teachings herein. Hypervisor 104 may include a virtual machine monitor (VMM) component 108 for each VM that is instantiated and running on host 101. In such an embodiment, each VM 102 conceptually includes a virtual hardware platform that includes virtual devices such as a virtual host bus adapter (VHBA) 107 and a virtual disk (which may be represented by a file stored in storage disks 114). The perception that VM 102 includes such virtual devices is effectuated through the interaction of device driver components in a "guest operating system" running in VM 102 with device emulation components, such as VHBA emulator 106, in VMM 108 corresponding to VM 102. File system calls initiated by a guest operating system in VM 102 to perform file system-related data transfer and control operations are processed and passed to VMM 108 and other components of hypervisor 104 that implement the virtual system support necessary to coordinate operation with the hardware of host 101. For example, VHBA emulator 106 for VM 102 functionally enables data transfer and control operations originating from VHBA 107 of VM 102 to be ultimately passed to the physical host bus adapter (HBA) of host 101 which, as depicted in FIG. 1, connects host 101 to a FC switch 110. It should be recognized that although only one VM 102 and one VHBA emulator 106 are shown, multiple VHBAs and VMs may be provided in embodiments.

As depicted in the embodiment of FIG. 1, host 101-1 (i.e., its physical HBA) connects to a physical port P1 of FC switch 110. A Vport 112 (as previously discussed) bound to physical port P1 is instantiated by FC switch 110 for VM 102 and a connection session between Vport 112 and VHBA emulator 106-1 is established to send/receive communications, such as input/output (I/O) requests (e.g., for read and writes to a virtual disk file corresponding to VM 102 stored in storage disks 114) from VM 102 to FC switch 110. As previously discussed, Vport 112 is a unique identifier and, for example, may correspond to or may be generated using a unique identifier associated with its corresponding VM 102. For example, in one embodiment, a worldwide name (WWN) or worldwide identifier (WWID) that uniquely identifies host 101-1 may be utilized to generate a such a unique identifier for each VM running on host 101-1 (e.g. by appending or otherwise incorporating sequential sequence numbers to the WWN or WWID, etc.) which can then be associated with or used to generate the Vport corresponding to such VM. It should be recognized that alternative techniques may be utilized to generate Vports and unique identifiers for corresponding VMs.

During live migration of VM 102 from host 101-1 to host 101-2, VHBA emulator 106-1 may, for example, be recreated on host 101-2 through a new VHBA' emulator 106 when state information from VHBA emulator 106-1 is copied to host 101-2. As depicted in the embodiment FIG. 1, host 101-2 is connected to FC switch 110 through a second physical port P2. To more efficiently support migration, rather than requiring Vport 112 to be deleted (and tearing down its corresponding connection session) on host 101-1 and a new Vport to be created on host 101-2 as previously discussed, FC switch 110 now supports a pause command (or other similar command) that is used to disassociate Vport 112 from physical port P1 when VM 102 is migrated from host 101-2 to host 101-2. When transmitted by hypervisor 104-1 to FC switch 110, such a pause command signals to FC switch 110 that VM 102 may be migrating to a different host (e.g., from host 101-1 to host 101-2) that is connected to FC switch 110 (or another FC switch in the SAN) on a different physical port, such as physical port P2. The pause I/O command "suspends" Vport 112 which effectively "unbinds" Vport 112 from physical port P1 such that communications between host 101-1 and FC switch 110 that reference Vport 112 cannot be performed. The pause command, however, does not tear down the connection session that had originally been established during the creation of Vport 112 between Vport 112 and the LUN or storage volume of storage disks 114 containing the virtual disk file for VM 102. As such, when VHBA' emulator 106 is created on host 101-2, host 101-2 can transmit to FC switch 110 a resume command corresponding to Vport 112 that causes FC switch 110 to associate Vport 112 to physical port P2 (which is connected to host 101-2), thereby re-establishing connection sessions between VM 102 (as migrated to host 101-2) and its virtual disk file in storage disks 114 through Vport 112. In certain embodiments and as further discussed below, these pause and resume commands are also utilized in the previously discussed "preflight checks" in addition to the actual migration of VM 102. Because the pause and resume commands do not require FC switch 110 to update its internal data structures to either delete or create new Vports, these commands take less time and are less costly than the delete and create I/O commands previously described.

Figure 2:
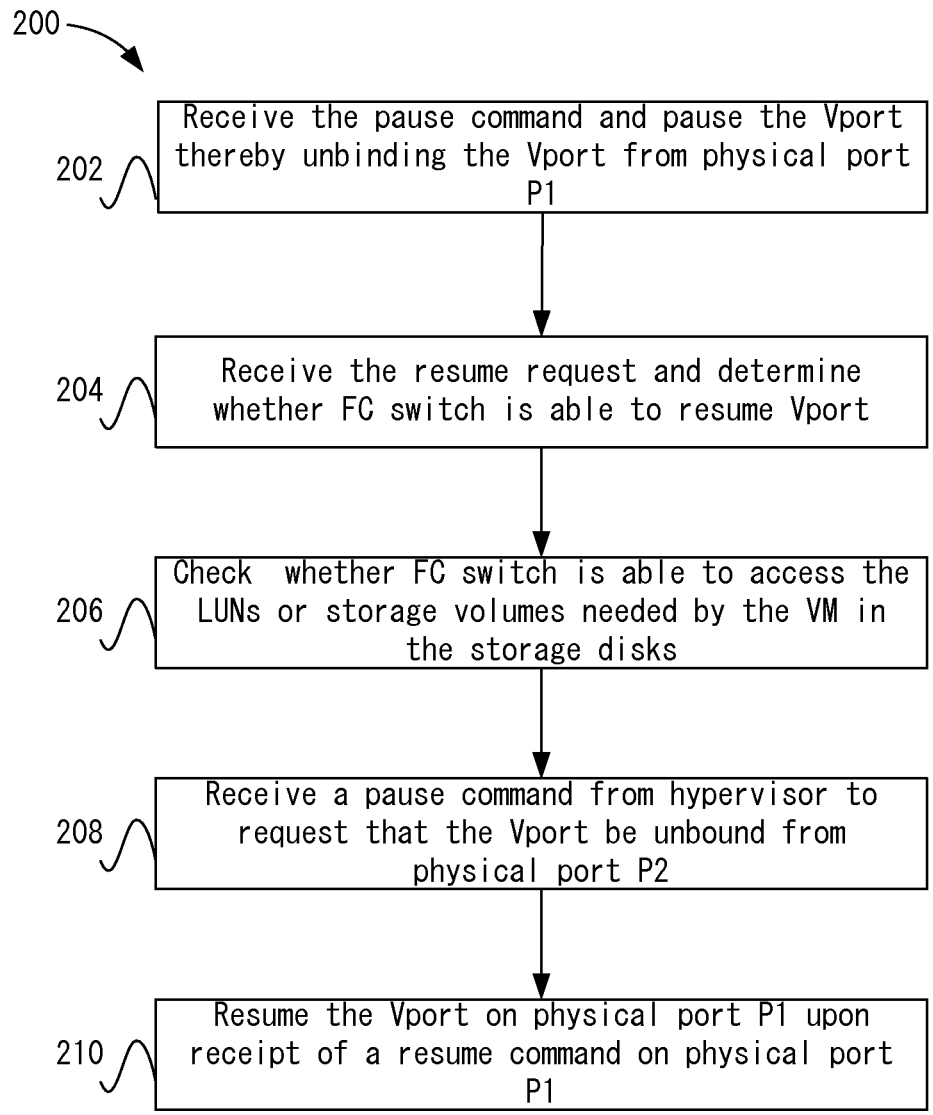
FIG. 2 shows a simplified flowchart of a method for performing the pre-flight check according to one embodiment.

FIG. 2 shows a simplified flowchart 200 of a method for performing a pre-flight check according to one embodiment. As previously mentioned, a preflight check prior to a live migration determines if host 101-2 (e.g., via FC switch 110 to which it is coupled) has access to the appropriate LUNs or storage volumes of storage disks 114 required by VM 102 (e.g., those LUNs or storage volumes that include the corresponding virtual disk file of VM 102). In one embodiment, during a pre-flight check for a live migration of VM 102 from host 101-1 to host 101-2, hypervisor 104-1 transmits a request to FC switch 110 to pause Vport 112. At 202, FC switch 110 receives the pause command and pauses Vport 112, thereby unbinding Vport 112 from physical port P1 as previously discussed.

In cooperation with hypervisor 104-1, hypervisor 104-2 on host 101-2 may then transmit a request to FC switch 110 to which it is coupled to resume Vport 112. The FC switch connected to host 101-2 receives the resume request and determines whether it is able to resume Vport 112 at 204. In particular, if the FC switch is able to connect to the particular LUNs or storage volumes of storage disks 114 that store the virtual disk file of VM 102, then the FC switch 110 is able to support the migration. If FC switch 110 is unable to connect to such LUNs or storage volumes, then it is unable to support the migration. For example, in the embodiment of FIG. 2, since host 101-2 is coupled to the same FC switch 110 as host 101-2 (but connected via physical port P2 rather than physical port P1), FC switch 110 is able to support the migration request for Vport 112 received from host 101-2 via physical port P2 since it had originally supported Vport 112 when bound to physical port P1 (i.e. for host 101-1) and is still maintaining the current connection session for Vport 112 to the LUN or storage volume relating to the virtual disk file of VM 102 in storage disks 114. At 206, FC switch 110 checks whether it is able to access the LUNs or storage volumes needed by VM 102 in storage disk 114. In one embodiment, for example, hypervisor 104-2 may send a list of those LUNs or storage volumes in storage disks 114 that need to be accessible to host 101-2 for VM 102 FC switch 110 then communicates with the storage disks 114 to determine if the required LUNs or storage volumes are accessible to host 101-2. Because the connection for Vport 112 is not torn down, it may be expected that the connectivity to the particular LUNs or storage volumes of storage disks 114 is supported by host 101-2. In one embodiment, the pre-flight check of connectivity to the particular LUNs or storage volumes of storage disks 114 may be omitted. However, other checks may be performed, such as physical connectivity from host 101-2 to physical port P2 during the pre-flight check.

Figure 3A:
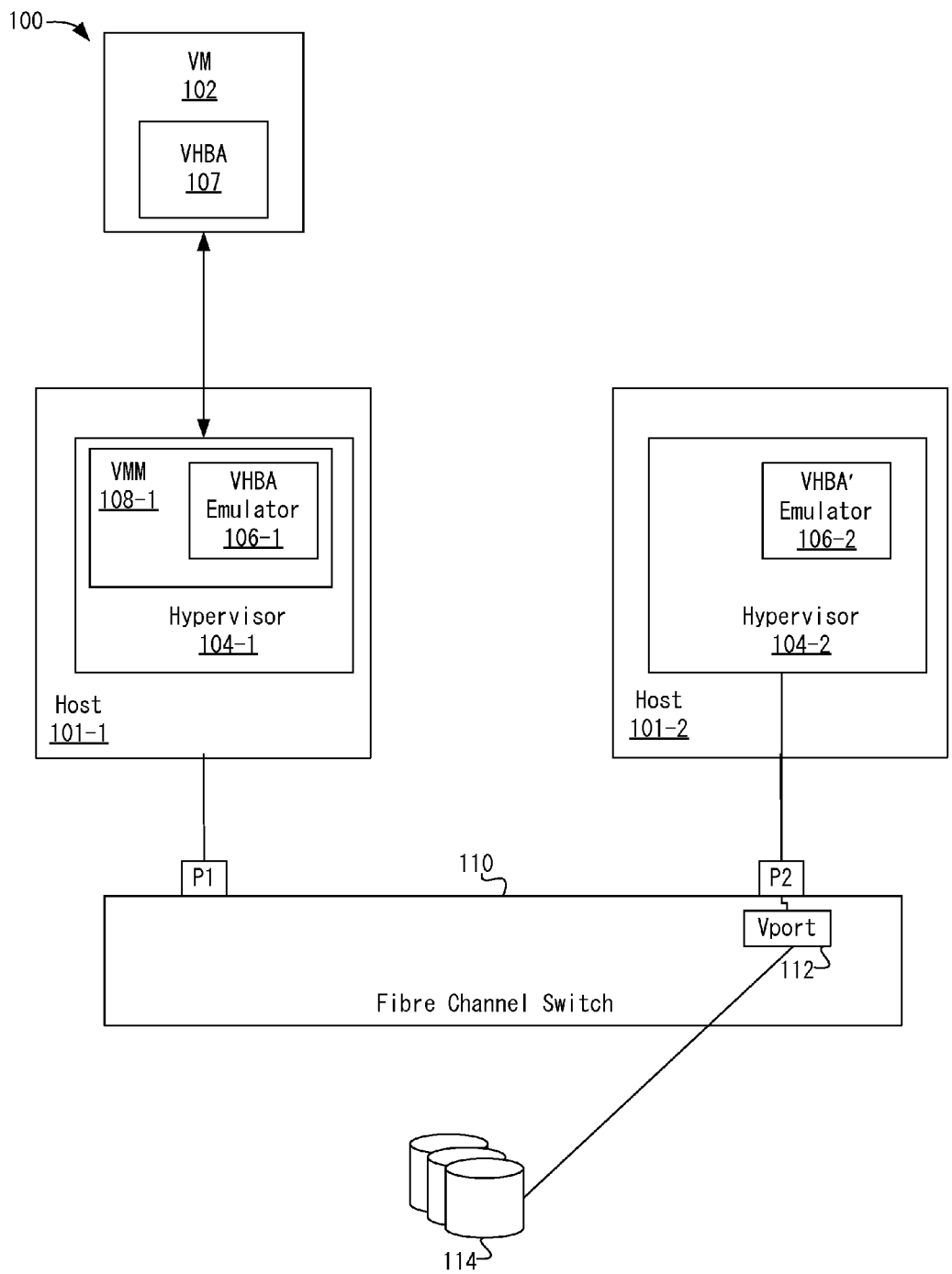
FIG. 3a shows an example of the system when a Vport has been resumed according to one embodiment.

FIG. 3a shows an example of system 100 when Vport 112 has been resumed on a candidate host (e.g., host 101-2) during a pre-flight check according to one embodiment. As depicted in FIG. 3a, hypervisor 104-1, while performing a pre-flight check has issued a pause command to FC switch 110 in order to unbind Vport 112 from physical port P1. Although Vport 112 has been unbound from physical port P1, VM 102 continues to run in host 101-1 and may be sending I/O commands to VHBA emulator 106-1 because VM 102 is not aware that hypervisor 104-1 has paused Vport 112. In such a scenario, hypervisor 104-1 may queue the I/O commands sent by VM 102 after it has transmitted a pause command to FC switch 110 to pause Vport 112.

As shown in host2, VHBA' emulator 106-2 has been created. A VMM may not be created for a VM because the VM has not been migrated yet. In other embodiments, VHBA' emulator 106-2 may not be created; rather, hypervisor 104-2 may directly communicate with FC switch 110. Hypervisor 104-2 through VHBA' emulator 106-2 in host 101-2, upon receiving information from hypervisor 104-1 regarding which LUNs or storage volumes are required by VM 102, transmits a resume command to FC switch 110 in order to resume Vport 112 on physical port P2. FC switch 110 then successfully confirms resumption of Vport 112 on physical port P2 to host 101-2. It should be recognized that in an alternative embodiment where host 101-2 is connected to a different FC switch, the FC switch may need to perform an accessibility check to determine whether it is able to reach the appropriate LUNs or volumes relating to the virtual disk file (or other related files) of VM 102 before confirming resumption of Vport 112.

Once FC switch 110 confirms resumption of Vport 112 on physical port P2 (i.e., indicating that Vport 112 can be supported on physical port P2 because FC switch 110 can reach the relevant LUNs or volumes in disk storage 114 relating to Vport 112), at 208, FC switch 110 receives a pause command from hypervisor 104-2 to request that Vport 112 be unbound from physical port P2.

Figure 3B:
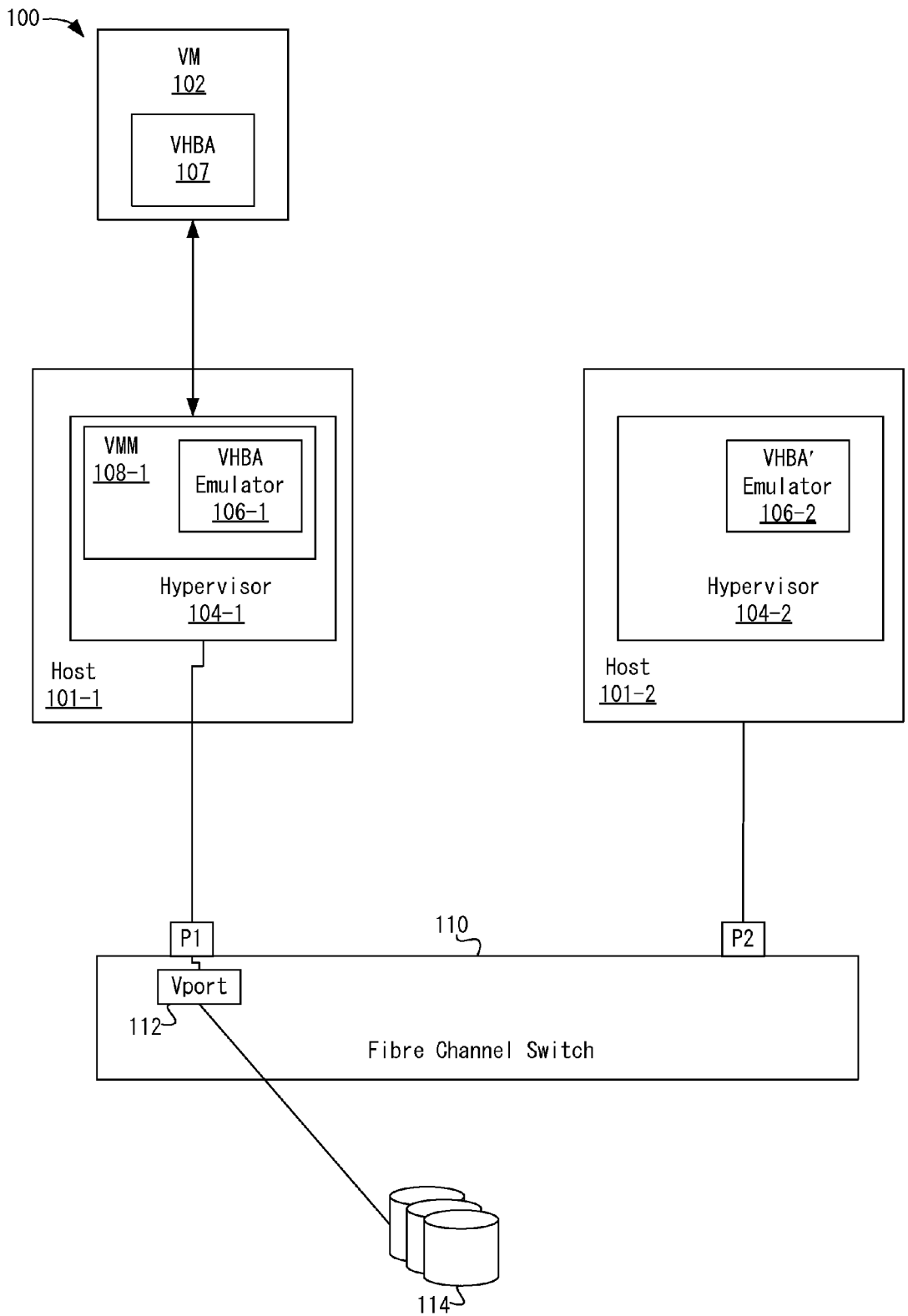
FIG. 3b shows an example of system after resuming the Vport after the pre-flight check according to one embodiment.

As depicted in FIG. 3b, after hypervisor 104-2 unbinds Vport 112 from physical port P2, hypervisor 104-1 subsequently transmits a resume command to FC switch 110 to resume Vport 112 on physical port P1 and, at 210, FC switch 110 resumes Vport 112 on physical port P1. At 210, once FC switch 110 confirms resumption of Vport 112 on physical port P1, hypervisor 104-1 is able to re-establish the connection between VHBA emulator 106-1 in VMM 108-1 and Vport 112 enabling any previous I/O commands from VM 102 that had been queued by hypervisor 104-1 (as previously discussed) after pausing Vport 112 at 202 to be transmitted FC switch 110 via resumed Vport 112. Accordingly, a pre-flight check to determine whether host 101-2 is a viable candidate to migrate VM 102 (e.g., to ensure that host 101-2 is able to access the appropriate LUNs or volumes needed by VM 102 in disk storage 114) is completed without requiring VM 102 to cease execution on host 101-1. It should be recognized that in alternative embodiments, the pause and resume commands described herein are not utilized in such pre-flight checks prior to migration; instead, for example, a new Vport may be created (and subsequently deleted) in FC switch 110 to check whether host 101-2 can access the LUNs or disk volumes relating to VM 102.

Figure 4:
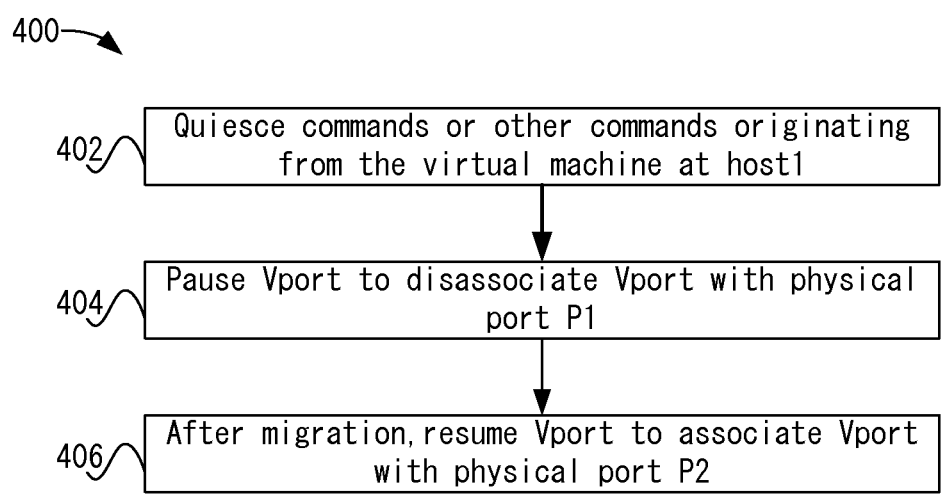
FIG. 4 depicts a simplified flowchart of a method for migrating a virtual machine according to one embodiment.

FIG. 4 depicts a simplified flowchart 400 of a method for migrating VM 102 according to one embodiment. Upon a request to perform a migration of VM 102 (e.g., from an IT administrator, etc.) to host 101-1, at 402, hypervisor 104-1 quiesces I/O commands and other commands originating from VM 102 at host 101-1. In one embodiment, hypervisor 104-1 quiesces such I/O commands by ceasing to propagate to FC switch 110 any I/O commands from VM 102 received at VHBA emulator 106-1 and waiting for all "in flight" previously issued I/O commands to complete.

After all in-flight I/O commands have completed, hypervisor 104-1 then initiates a migration process to move VM 102 from host 101-1 to host 101-2. It should be recognized that different methods for migrating VM 102 may be used, including, for example, a live migration process offered by VMware known as VMotion™, which involves transferring the memory and device state of VM 102 from host 101-1 to host 101-2 while VM 102 continues to run on host 101-1.

Once the state of VM 102 has been successfully transferred to host 101-2, hypervisor 104-1 transmits a pause command to FC switch 110 and, at 404, FC switch 110 pauses Vport 112 thereby disassociating Vport 112 from physical port P1 Then, hypervisor 104-2 on host 101-2, on behalf of VM 102, transmits a resume command for Vport 112 to FC switch 110 and, at 406, FC switch 110 resumes Vport 112 associating it with physical port P2 (to which host 101-2 is connected). Upon confirmation that Vport 112 has been resumed in FC switch 110, hypervisor 104-2 is able to re-establish the data path between Vport 112 and VHBA' emulator 106-2 of VMM 108-2 of VM 102 (which has adopted the state of VHBA emulator 106-1 when VM 102 was on host 101-1), thereby allowing communications to be resumed between VM 102 and relevant LUNs or storage volumes in storage disks 114 at 408 VHBA' emulator 106.

Figure 5:
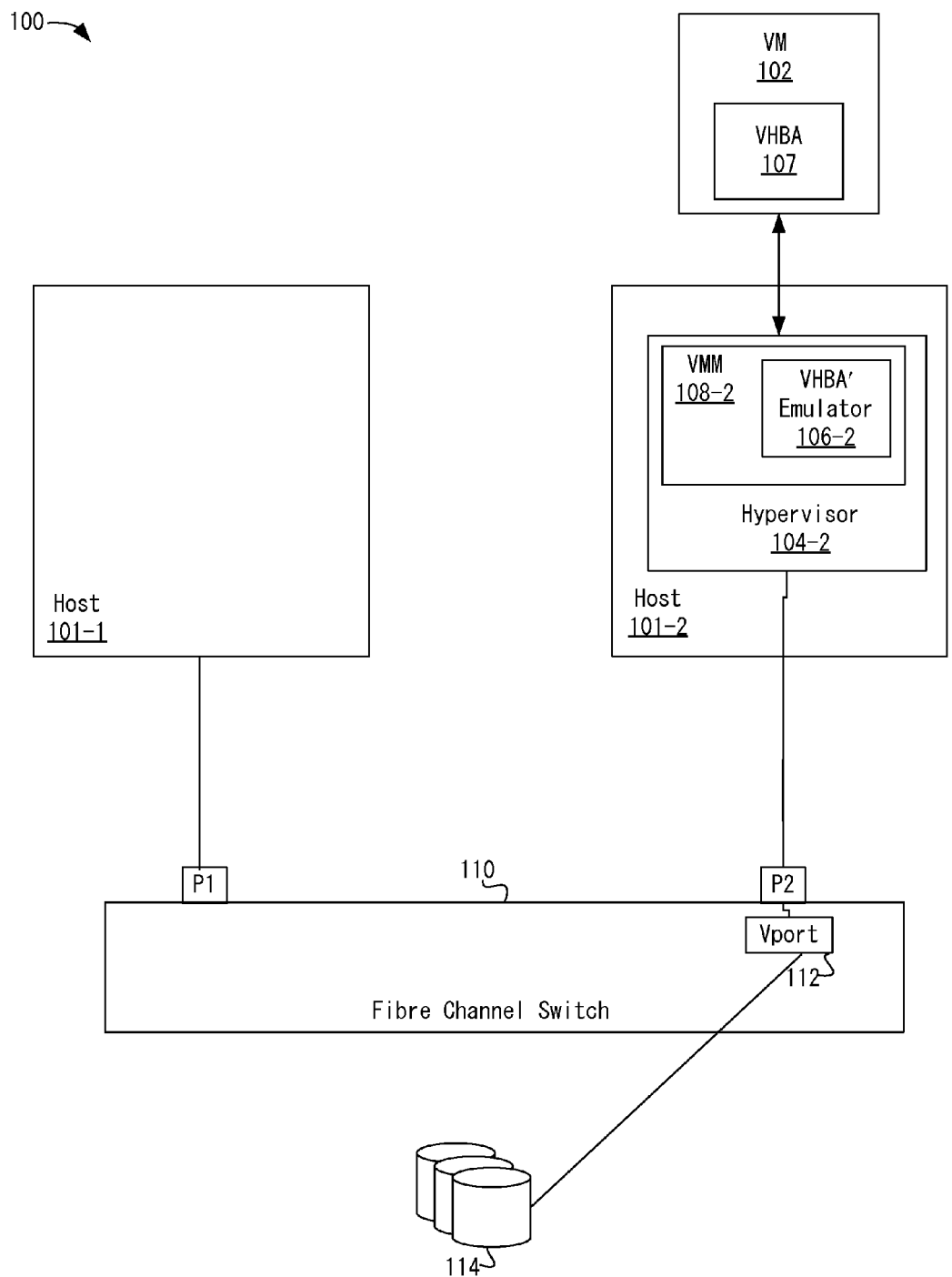
FIG. 5 shows an example of the system after the migration of the virtual machine according to one embodiment.

FIG. 5 shows an example of system 100 after the migration of VM 102 according to one embodiment. As depicted, VM 102 is now running on host 101-2 and VHBA emulator 106-1 has been removed from host 101-1. Also, VMM 108-2 for VM 102 has been created in host 101-2 and includes VHBA' emulator 106-2. As previously discussed, Vport 112, which had been previously bound to physical port P1 of FC switch 110 is now bound to physical port P2 as a result of the pause and resume commands issued by host 101-1 and host 101-2 respectively to FC switch 110.

Figure 6:
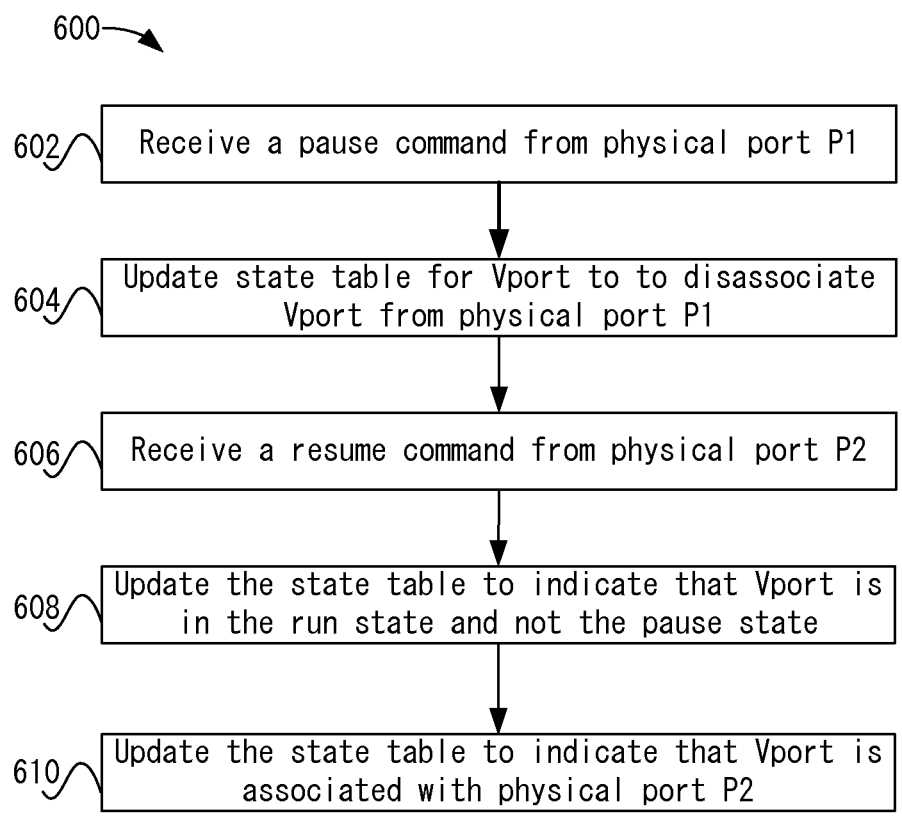
FIG. 6 depicts a simplified flowchart of a method for implementing the pause/resume I/O commands according to one embodiment.

It should be recognized that alternative embodiments of FC switches may implementing the pause and resume commands described herein differently. FIG. 6 depicts a simplified flowchart 600 of a method for implementing the pause and resume commands according to one embodiment. When, at 602, FC switch 110 receives a pause command from a host 101 at physical port P1, then at 604, FC switch 110 may update a state table for Vport 112 to disassociate Vport 112 and physical port P1. The state table may be used to track and manage active or paused Vport sessions, storing for each Vport, its corresponding physical port on the FC switch and its state (e.g., paused, active, etc.). As such, upon receiving a pause command at 602, FC switch may update an entry for Vport 112, modifying its state from "active" to "paused." It should be recognized that various alternative implementations to modify a state of a Vport can be utilized, including setting a flag or bit that indicates Vport 112 is in a pause state. In certain embodiments, upon a receiving a pause command, the entry of Vport 112 in the state table may further edited to remove an association between to physical port P1 for Vport 112 (although alternative embodiments, may simply leave the association standing, since Vport 112 is has not yet been associated with a different physical port).

At 606, FC switch 110 receives a resume command for Vport 112 from another host at physical port P2. Upon receipt of such a resume command, at 608, FC switch 110 updates its state table to change the state of Vport 112 from "pause" back to "active." Additionally, at 610, FC switch 110 updates the entry of Vport 112 in the state table to associate Vport 112 with physical port P2.

Figure 7:
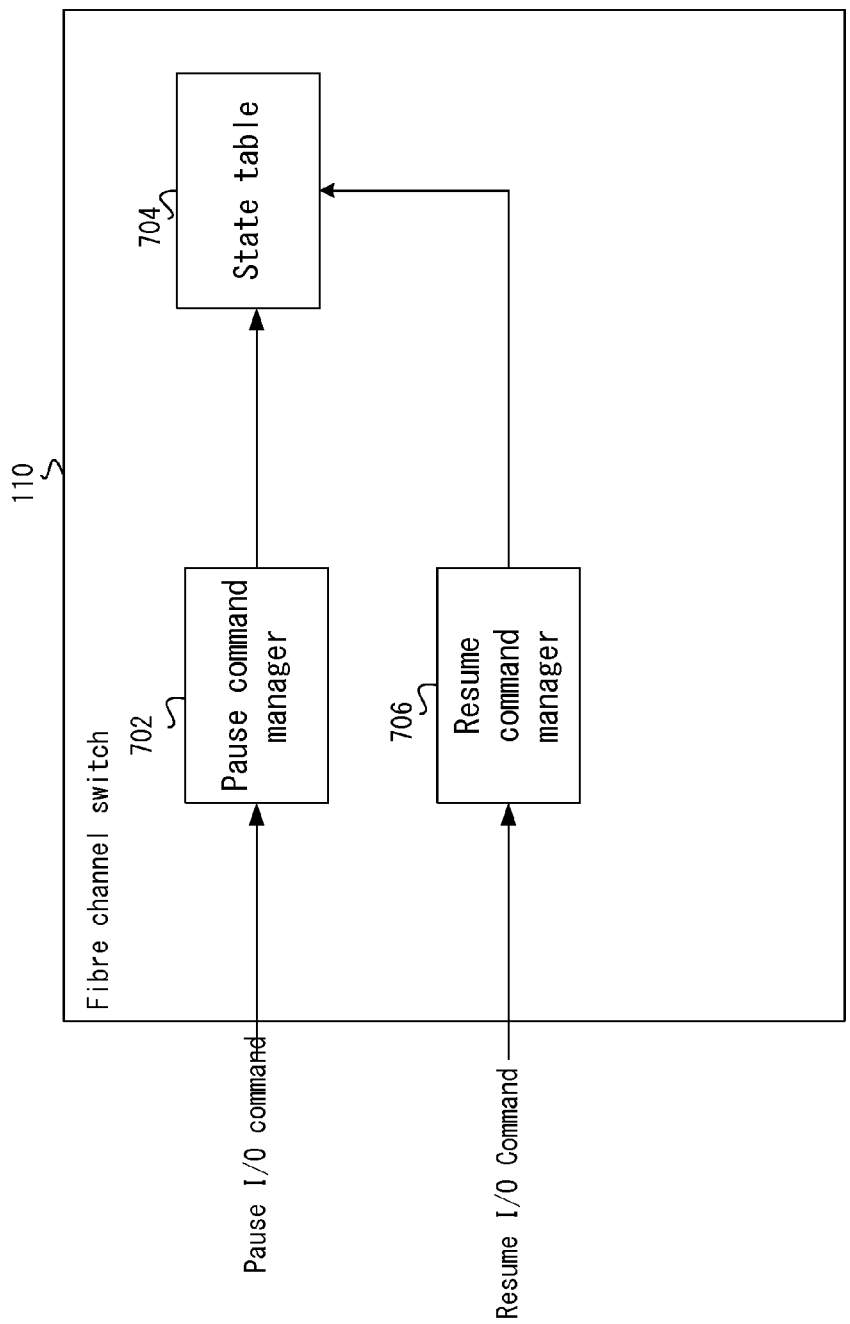
FIG. 7 shows a more detailed example of a Fibre Channel switch according to one embodiment.

FIG. 7 shows a more detailed example of FC switch 110 according to one embodiment. A pause command manager 702 receives the pause commands from a host 101 for Vport 112. Pause command manager 702 then updates a state table 704 to set Vport 112 to a pause state. A resume command is received at a resume command manager 706. The resume command is received at particular physical port of FC switch and therefore FC switch 110 updates its state table 704 to indicate that Vport 112 is in an active state and is bound to the physical port where the resume command was received. Alternative embodiments may enable a resume command to specify a physical port to which Vport 112 should be bound, rather than relying on the actual physical port of FC switch 110 which receives the resume command.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. It should be recognized many variations, modifications, additions, and improvements are possible, regardless the degree of virtualization.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of particular embodiments. In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
    upon receipt from a first host of a command to pause a virtual port (Vport) associated with a first physical port establishing a connection with the first host, changing a current state of the Vport from an active state to a paused state, wherein the changing of the current state of the Vport to the paused state does not tear down a current session for communications between the Vport and a set of storage disks; and
    upon receipt from a second host of a command to resume the Vport at a second physical port establishing a connection with the second host, changing the current state of the Vport from the paused state to the active state and associating the Vport with the second physical port.

2. The method of claim 1, further comprising, upon receipt of the command to pause, rejecting any communications from the first host through the first physical port that identifies the Vport.

3. The method of claim 1, further comprising, upon receipt of the command to pause, disassociating the Vport from the first physical port.

4. The method of claim 1, wherein the command to pause is issued by a hypervisor in the first host during a process to migrate a virtual machine running on the first host to the second host.

5. The method of claim 4, wherein the command to resume is issued by a second hypervisor in the second host after a state of the virtual machine has been transferred from the first host to the second host.

6. The method of claim 1, wherein the command to pause is issued by a hypervisor in the first host during a pre-flight check process to determine whether the second host can support the current session between the Vport and the set of storage disks.

7. The method of claim 6, wherein the command to resume is issued by a hypervisor of the second host during the pre-flight check process to determine whether the second host can support the Vport.

8. A non-transitory computer-readable storage medium containing instructions for controlling a computer system to be operable to:
    change a current state of the Vport from an active state to a paused state upon receipt from a first host of a command to pause a virtual port (Vport) associated with a first physical port establishing a connection with the first host, wherein the changing of the current state of the Vport to the paused state does not tear down a current session for communications between the Vport and a set of storage disks; and
    change the current state of the Vport from the paused state to the active state and associating the Vport with the second physical port upon receipt from a second host of a command to resume the Vport at a second physical port establishing a connection with the second host.

9. The non-transitory computer-readable storage medium of claim 8, further operable to reject any communications from the first host through the first physical port that identifies the Vport upon receipt of the command to pause.

10. The non-transitory computer-readable storage medium of claim 8, further operable to disassociate the Vport from the first physical port upon receipt of the command to pause.

11. The non-transitory computer-readable storage medium of claim 8, wherein the command to pause is issued by a hypervisor in the first host during a process to migrate a virtual machine running on the first host to the second host.

12. The non-transitory computer-readable storage medium of claim 8, wherein the command to resume is issued by a second hypervisor in the second host after a state of the virtual machine has been transferred from the first host to the second host.

13. The non-transitory computer-readable storage medium of claim 8, wherein the command to pause is issued by a hypervisor in the first host during a pre-flight check process to determine whether the second host can support the current session between the Vport and the set of storage disks.

14. The non-transitory computer-readable storage medium of claim 8, wherein the command to resume is issued by a hypervisor of the second host during the pre-flight check process to determine whether the second host can support the Vport.

15. An apparatus comprising:
    one or more computer processors; and
    a computer-readable storage medium comprising instructions for controlling the one or more computer processors to be operable to:
    change a current state of the Vport from an active state to a paused state upon receipt from a first host of a command to pause a virtual port (Vport) associated with a first physical port establishing a connection with the first host, wherein the changing of the current state of the Vport to the paused state does not tear down a current session for communications between the Vport and a set of storage disks; and
    change the current state of the Vport from the paused state to the active state and associating the Vport with the second physical port upon receipt from a second host of a command to resume the Vport at a second physical port establishing a connection with the second host.

16. The apparatus of claim 15, further operable to reject any communications from the first host through the first physical port that identifies the Vport upon receipt of the command to pause.

17. The apparatus of claim 15, further operable to disassociate the Vport from the first physical port upon receipt of the command to pause.

18. The apparatus of claim 15, wherein the command to pause is issued by a hypervisor in the first host during a process to migrate a virtual machine running on the first host to the second host.

19. The apparatus of claim 15, wherein the command to resume is issued by a second hypervisor in the second host after a state of the virtual machine has been transferred from the first host to the second host.

20. The apparatus of claim 15, wherein the command to pause is issued by a hypervisor in the first host during a pre-flight check process to determine whether the second host can support the current session between the Vport and the set of storage disks.

21. The apparatus of claim 15, wherein the command to resume is issued by a hypervisor of the second host during the pre-flight check process to determine whether the second host can support the Vport.

* * * * *